United States Patent [19]

Ohgami et al.

[11] Patent Number: 5,764,478
[45] Date of Patent: Jun. 9, 1998

[54] PORTABLE APPARATUS HAVING EJECTOR FOR EJECTING PACK DEVICE

[75] Inventors: Keizo Ohgami; Masashi Mikami; Kenichi Ishikawa; Takayuki Arisaka; Yasuyuki Suzuki, all of Tokyo, Japan

[73] Assignee: Kabushiki Kaisha Toshiba, Kawasaki, Japan

[21] Appl. No.: 846,484

[22] Filed: Apr. 30, 1997

[30] Foreign Application Priority Data

May 9, 1996 [JP] Japan ................................. 8-114928

[51] Int. Cl.$^6$ .............................. G06F 1/16; H05K 7/10; H01R 13/62; F16H 21/44
[52] U.S. Cl. ............................ 361/684; 439/160; 74/96; 74/107; 74/516; 74/554
[58] Field of Search ................................. 439/152, 159, 439/160; 369/708.1; 361/684, 685, 754, 798; 74/96, 107, 516, 554

[56] References Cited

U.S. PATENT DOCUMENTS 5,446,394  8/1995  Cassidy ........................... 439/160 X

*Primary Examiner*—Michael W. Phillips
*Attorney, Agent, or Firm*—Limbach & Limbach, LLP

[57] ABSTRACT

A portable apparatus comprises a housing including a pack receptacle having an insertion port. The pack receptacle has a first connector facing to the insertion port. A circuit board is contained in the housing. The circuit board is positioned between the pack receptacle and a bottom wall of the housing. The pack receptacle contains a pack device to be detachable through the insertion port. The pack device has a second connector to be detachably connected to the first connector. The pack receptacle has an ejector for ejecting the pack device. The ejector has a pressing member for pressing the pack device in a direction away from the first connector and an operation member, positioned at the upper portion of the circuit board to be linked with the pressing member. The operation member has a lever section along the peripheral wall of the housing. The operation member is supported by the housing to be slidable between a first position where the lever section is stored in the housing and a second position where the lever section is projected to the outside of the housing. The operation member is supported by said housing to be rotatable between an ejecting position where the pressing member is advanced to the pack device contained in the pack receptacle at the second position and a releasing position where the pressing member is separated away from the pack device.

19 Claims, 8 Drawing Sheets

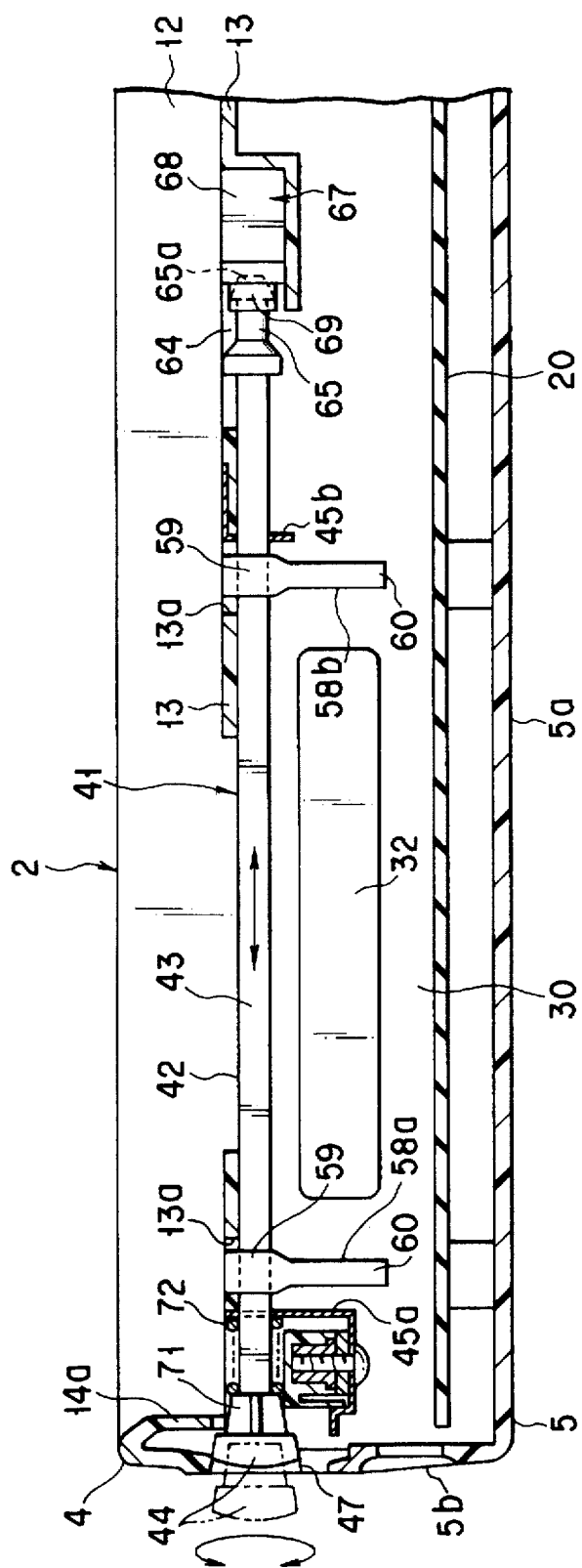
F I G. 3

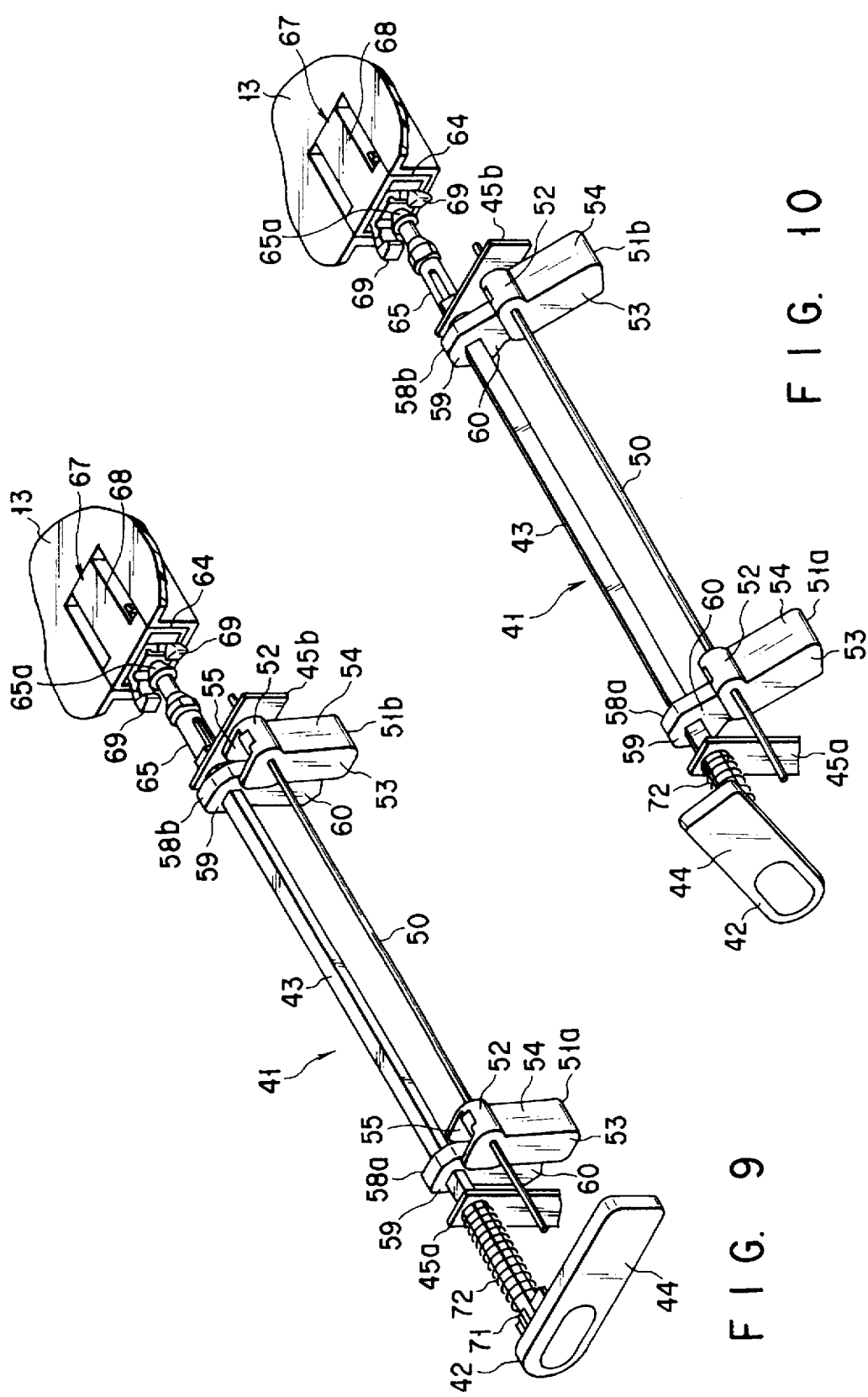

5,764,478

PORTABLE APPARATUS HAVING EJECTOR FOR EJECTING PACK DEVICE

BACKGROUND OF THE INVENTION

The present invention relates to a portable apparatus such as a portable computer having a box-shaped housing and more particularly to a structure for detachably containing a pack device such as a floppy disk drive device or a CD-ROM drive device.

In the field of the portable computer, which is mainly used for characters and graphics, there has been widely used the so-called multimedia in which motion pictures and voice are combined with each other. Due to this, there has been recently manufactured a portable computer having a CD-ROM drive device for reading data such as characters, voice, images, etc recorded onto an optical disk.

The computer of this kind comprises a box-shaped housing having a keyboard, and a display device supported by the housing. The CD-ROM drive device is packaged as one module, which is similar to a floppy disk drive device (FDD). The CD-ROM drive device has substantially the same size as the FDD. Due to this, in the recent portable computer in which the housing is compactly designed, a space for containing the CD-ROM drive device and the FDD in the housing at the same time cannot be ensured.

In order to solve this problem, there has been developed a portable computer in which either the CD-ROM drive device or the FDD can be selectively contained in the housing. This kind of the computer comprises a receptacle for detachably containing either the CD-ROM drive device or the FDD. The receptacle has an connection port opened to a peripheral wall of the housing and a first connector facing to the connection port. The first connector is supported by a circuit board. The circuit board is fixed to a bottom wall of the housing with a screw. Each of the CD-ROM drive device and the FDD has a second connector. The second connector is detachably connected to the first connector when either the CD-ROM drive device or the FDD is contained in the receptacle from the connection port. By this connection, the computer is electrically connected to the CD-ROM drive device or the FDD.

The conventional computer comprises an ejector for ejecting the CD-ROM drive device or the FDD from the receptacle. The ejector has an operation lever provided at the bottom wall of the housing. The operation lever is supported by the bottom wall to be rotatable between a first position overlaid on the bottom wall of the housing and a second position projected to the lower portion of the bottom wall.

The operation lever of the ejector has a pressing section projecting to the receptacle. The pressing section is positioned in the vicinity of the first connector. When the operation lever is rotated to the second position from the first position, the pressing section comes in contact with the CD-ROM drive device or the FDD to be pressed to a direction, which is away from the first connector. Thereby, the connection of the second connector to the first connector is released, the CD-ROM drive device or the FDD is pushed to the outside of the housing through the insertion port.

According to the structure of the conventional ejector, the pressing section of the operation lever extends to the receptacle from the bottom wall of the housing. However, the bottom wall of the housing is a portion for supporting the circuit board. Due to this, if the pressing section of the ejector is provided on the bottom wall, there is possibility that the pressing section and the circuit board will be interfered with each other. Due to this, the circuit board must be shaped to avoid the pressing section of the ejector. As a result, the size of the circuit board is limited.

To solve this problem, the following problem can be considered:

Specifically, a slider is provided at the upper portion of the receptacle, which links with the slider, such that the operation lever is positioned at the peripheral wall of the housing. This type of the slider has an end portion facing to the first connector. The end portion has a pair of engaging pieces, which are bent at right angles. The engaging pieces are hooked on the end portion of the CD-ROM drive device contained in the receptacle or the end portion of the FDD. Then, if the slider is slid in a direction, which is away from the first connector, the CD-ROM drive device or the FDD can be pushed out of the receptacle.

The slider must be provided in the limited space between the upper portion of the receptacle and the CD-ROM drive device or the FDD. As a result, since the slider must be formed of a thin metallic plate, the strength of the engaging pieces cannot be sufficiently obtained. Then, connection force of the first and second connectors is larger than that of a general expansion card and a card connector. As a result, large force is applied onto the engaging pieces of the slider when the CD-ROM drive device or the FDD is ejected from the receptacle. Due to this, since there is possibility that the engaging pieces will be deformed, the CD-ROM drive device or the FDD can not smoothly ejected from the receptacle.

Moreover, in consideration of the operation of the ejector, the operation lever of the slider must be projected outward from the peripheral wall of the housing. As a result, since the presence of the operation lever is emphasized too much, the appearance of the housing becomes worse. In addition, an operator's finger easily contacts the operation lever during the use of the computer. As a result, there is possibility that the CD-ROM drive device or the FDD will be undesirably ejected from the receptacle. If the CD-ROM drive device or the FDD is undesirably ejected from the receptacle during the use of the computer, data recorded onto the floppy disk is erased, or trouble of the computer is caused.

BRIEF SUMMARY OF THE INVENTION

A first object of the present invention is to provide a portable apparatus in which a size of a circuit board is not limited and an eject operation of a pack device can be surely and easily carried out and a lever portion may not be projected to the outside of a housing when no eject operation is needed.

A second object of the present invention is to provide a portable apparatus in which an eject operation can be surely carried out and an appearance of a housing can be maintained well when no eject operation is needed.

In order to achieve the first object, there is provided a portable apparatus comprising:

a housing, having a bottom wall and a peripheral wall continuous to the bottom wall, and an insertion port formed on the peripheral wall;

a pack receptacle defined to an interior of the housing, the pack receptacle continuous to the insertion port, and having a first connector facing to the insertion port;

a pack device detachably contained in the pack receptacle through the insertion port, the pack device having a second connector detachably connected to the first connector when the pack device being contained in the pack receptacle;

a circuit board contained in the interior of the housing, the circuit board placed between the pack receptacle and the bottom wall of the housing; and an ejector, provided in the pack receptacle, for ejecting the pack device from the pack receptacle, wherein the ejector includes pressing means for pressing the pack device in a direction away from the first connector, and operating means for linking with the pressing means, the operating means is positioned at the upper portion of the circuit board, and has a lever section along the peripheral wall of the housing, the operating means is supported by the housing to be slidable between a first position where the lever section is stored in the peripheral wall of the housing and a second position where the lever section is projected to the outside of the peripheral wall, and the operating means is supported by the housing to be rotatable between an ejecting position where the pressing means is advanced to the pack device contained in the pack receptacle at the second position, and a releasing position where the pressing means is positioned to be away from the pack device.

Also, in order to achieve the first object, there is provided a portable apparatus comprising:

a housing, having a bottom wall and a top wall facing to the bottom wall;

a pack receptacle defined to an interior of the housing, the pack receptacle having an insertion port and a first connector facing to the insertion port;

a pack device detachably contained in the pack receptacle through the insertion port, the pack device having a second connector detachably connected to the first connector when the pack device being contained in the pack receptacle;

a circuit board contained in the interior of the housing, the circuit board supported by the bottom wall at the lower portion of the pack receptacle; and an ejector, provided in the pack receptacle, for ejecting the pack device from the pack receptacle, wherein the ejector includes pressing means, positioned in the vicinity of the first connector and supported by the top wall of the housing, for pressing the pack device, contained in the pack receptacle, in a direction away from the first connector, and operating means for linking with the pressing means, the operating means has a lever section exposed to the outside of the housing, and the operating means is supported by the housing to be slidable between a first position where the lever section is stored in the housing and a second position where the lever section is projected to the outside of the housing, and the operating means is supported by the housing to be rotatable between an ejecting position where the pressing means is advanced to the pack device contained in the pack receptacle at the second position, and a releasing position where the pressing means is positioned to be away from the pack device.

According to the above-described structure, to take the pack device out of the pack receptacle, first, operating means of the ejector is slid to the second position from the first position so that the lever section is projected to the outside of the housing. Next, the lever section is manually operated such that operating means is rotated to the ejecting position and pressing means is advanced to the pack device contained in the pack receptacle. Thereby, the pack device is pressed to the direction which is away from the first connector through pressing means. As a result, the connection of the first connector to the second connector is released, and the pack device is pushed to the outside of the housing through the insertion port.

Since pressing means presses the pack device to the direction, which is away from the first connector, in accordance with the rotation of the operating means, the pack device can be pressed by strong force as compared with the conventional slide system. As a result, even if the connection force of the first connector and the second connector is strong, the force for pressing the pack device can easily overcome the connection force. Therefore, the eject operation of the pack device can be smoothly carried out.

The lever section of operating means is positioned at the peripheral wall of the housing. Due to this, operating means is not provided between the pack receptacle and the bottom wall of the housing. As a result, it is unnecessary to form a notch on the circuit board, which is provided between the pack receptacle and the bottom wall of the housing, to avoid operating means. Moreover, it is unnecessary to position the circuit board to avoid operating means. Therefore, the size of the circuit board may not be limited.

If operating means is slid to the second position, the lever section projects to the outside of the housing. As a result, the lever section can be easily grasped by the operator's fingers, operability is improved when operating means is rotated from the ejecting position to the releasing position, or from the releasing position to the ejecting position.

According to the present invention, for taking the pack device out of the pack receptacle, operating means is slid to the second position from the first position. Moreover, at the second position, operating means is rotated to the ejecting position from the releasing position. The conscious operation including the above-mentioned two steps is needed. As long as operating means is slid to the first position, the lever section is maintained to be stored in the housing. Also, it is difficult for the operator to touch the lever section by his fingers. As a result, undesirable eject operation of the pack device can be prevented in advance.

Also, when no eject operation is needed, operating means is slid to the first position, and the lever section is stored in the housing. As a result, a sense of unity of the lever section and the housing can be obtained, and the appearance of the housing can be maintained well.

In order to achieve the second object, there is provided a portable apparatus comprising:

a housing;

a receptacle defined to an interior of the housing, the receptacle having an insertion port and a first connector facing to the insertion port;

a function part detachably contained in the receptacle through the insertion port, the function part having a second connector detachably connected to the first connector when the function part being contained in the pack receptacle; and an ejector, provided in the receptacle, for ejecting the function part from the receptacle, wherein the ejector has an operation member manually operated, a pressing member for releasing the connection between the first and second connectors, and a linking member for linking the operation member with the pressing member, the operation member is supported by the housing to be slidable between a first position where the operation member is stored in the housing and a second position where the operation member projects to the outside of the housing, and the operation member is supported by the housing to be rotatable between a third position where the pressing member is advanced to the function part contained in the receptacle through the linking member to eject the function part from the receptacle and a fourth position where the pressing member is retracted to a direction away from the function part through the linking members in a state that the operation member is slid at the second position.

According to the above-described structure, in order to take the function part out of the receptacle of the housing, the operation member of the ejector is slid to the second position from the first position to be projected to the outside of the housing. At the second position, if the operation member is rotated to the third position by the manual operation, force caused by the rotation of the operation member is transmitted to the pressing member through the linking member. Thereby, the function part is pressed to the direction, which is away from the first connector, through pressing member, and the connection between the first and second connector is released. As a result, the function part is pressed to the outside of the housing through the insertion port.

Since the pressing member presses the function part to the direction of the insertion port in accordance with the rotation of the operation member, force for pressing the function part becomes large as compared with the conventional slider system. Due to this, even if the first and second connectors are firmly connected to each other, the connection therebetween can be easily released, and the eject operation of the function part can be ensured.

In the state that the operation member is slid to the second position, the operation member projects to the outside of the housing. Due to this, the operator can easily grasp the operating member by his fingers. Then, operability is improved in rotating the operation member from the third position to the fourth position or from the fourth position to the third position.

According to the present invention, for taking the function part out of the pack receptacle, the operation member is slid to the second position from the first position. Moreover, at the second position, the operation member is rotated to the third position. The conscious operation including the above-mentioned two steps is needed. As long as the operation member is slid to the first position, the operation member is maintained to be stored in the housing. Also, it is difficult for the operator to touch the operation member by his fingers. As a result, undesirable eject operation of the function part can be prevented in advance.

Also, when no eject operation is needed, the operation member is slid to the first position to be stored in the housing. As a result, a sense of unity of the operation member and the housing can be obtained, and the appearance of the housing can be maintained well.

The accompanying drawings, which are incorporated in and constitute a part of the specification, illustrate presently preferred embodiments of the invention, and together with the general description given above and the detailed description of the preferred embodiments given below, serve to explain the principles of the invention.

BRIEF DESCRIPTION OF THE SEVERAL VIEWS OF THE DRAWING

Additional advantages and modifications will readily occur to those skilled in the art. Therefore, the invention in its broader aspects is not limited to the specific details and representative embodiments, shown and described herein. Accordingly, various modifications may be made without departing from the spirit or scope of the general inventive concept as defined by the appended claims and their equivalents.

FIG. 3 is a sectional view of the computer showing a state that an ejector is combined into a keyboard support wall of the housing;

FIG. 9 is a perspective view of the ejector showing a state that the operation member is slid to the second position;

FIG. 10 is a perspective view of the ejector showing a state that operation member is rotated to the third position;

DETAILED DESCRIPTION OF THE INVENTION

An embodiment of the present invention will now be described with reference to the accompanying drawings.

Figure 1:
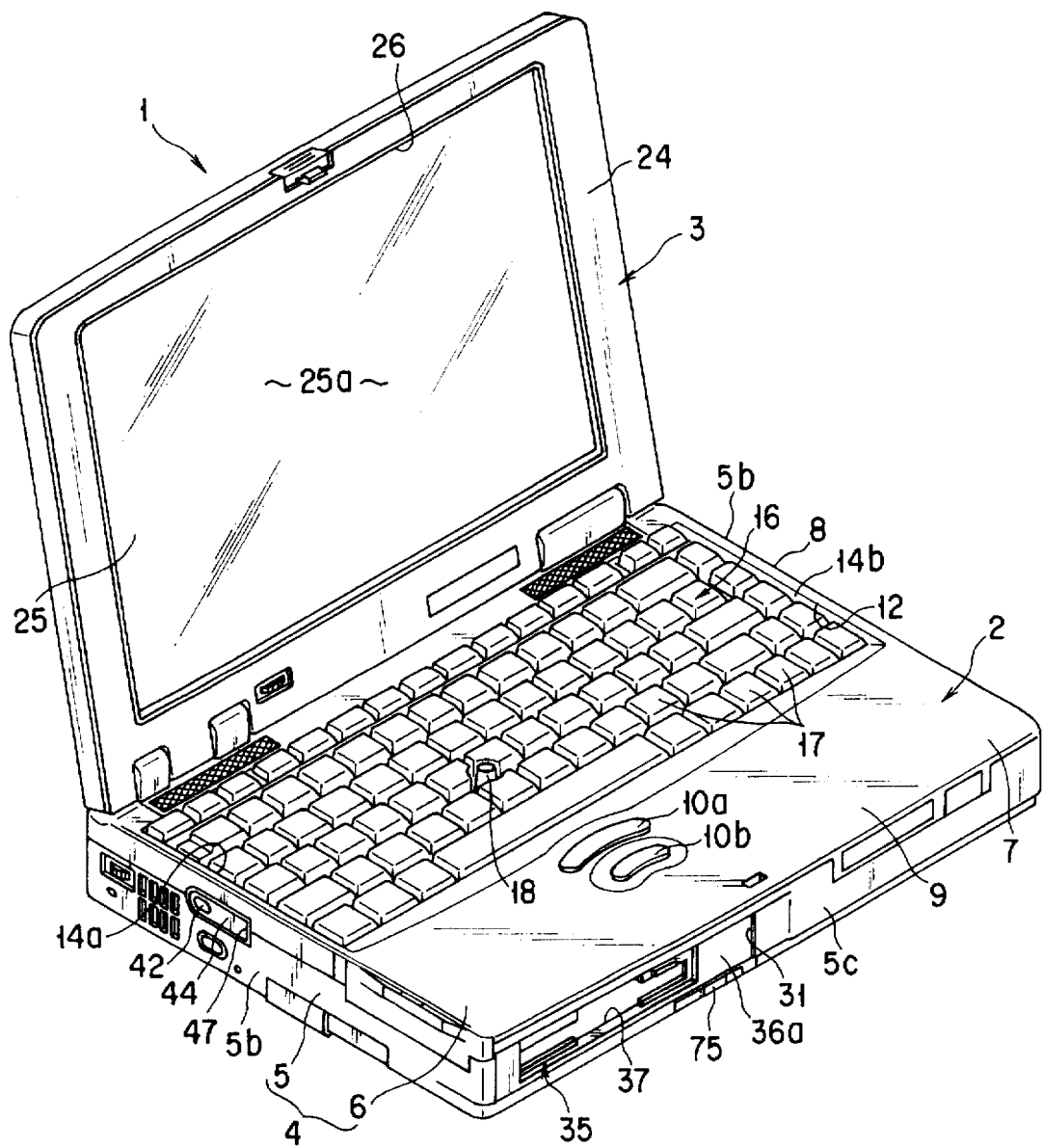
FIG. 1 is a perspective view of a portable computer of an embodiment of the present invention.

FIG. 1 shows a book-type portable computer 1. The computer 1 comprises a main body 2 and a display device 3 supported by the main body 2.

The main body 2 has a flat and box-shaped housing 4, which is made of synthetic resin. The housing 4 comprises a lower housing 5, and an upper housing 6, which is coupled to the lower housing 5. The lower housing 5 comprises a flat bottom wall 5a pair of side walls 5b, which are continuous to the bottom wall 5a, a front wall 5c, and a back wall (not shown). These side walls 5a, the front wall 5c, and the back wall extend upwardly from a peripheral portion of the bottom wall 5a, thereby forming a peripheral wall of the housing 4.

Figure 5:
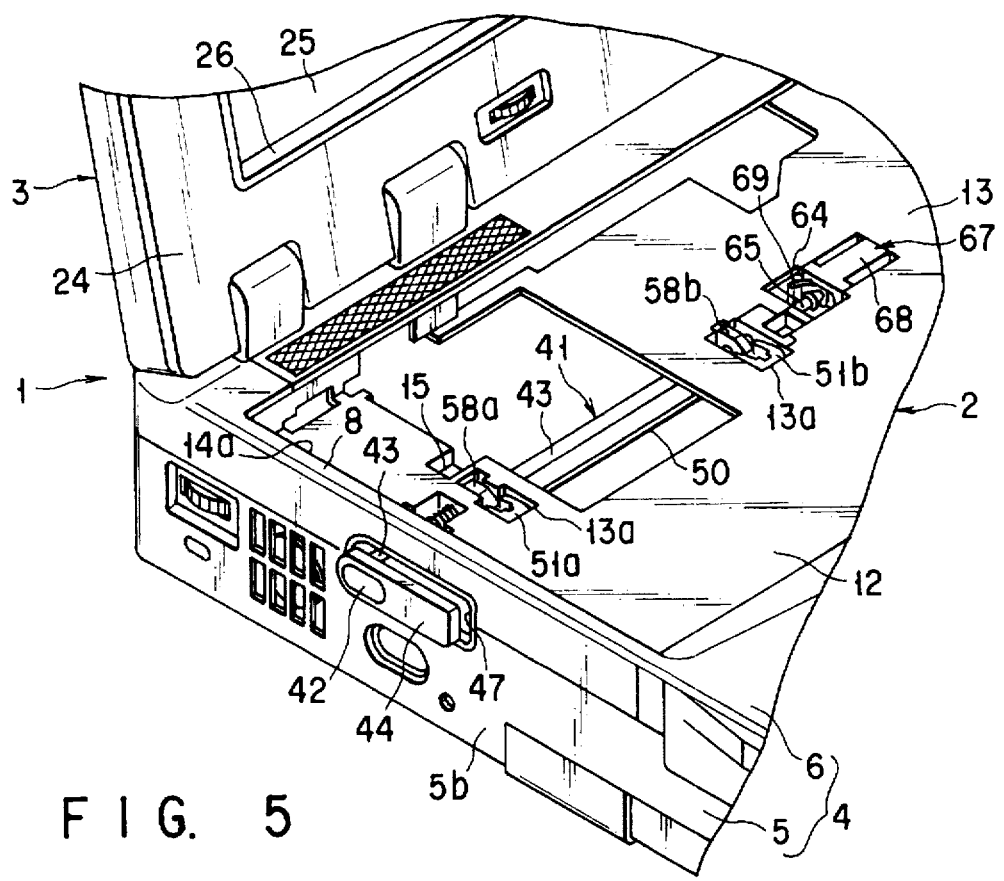
FIG. 5 is a perspective view of the computer showing a state that the ejector is combined into the keyboard support wall of the housing.

The upper housing 6 is flat and plate-shaped. The upper housing 6 is continuous to the side wall 5b, the front wall 5c, and the back wall. The upper housing 6 faces to the bottom wall 5a of the upper housing 5. The upper housing 6 has a first half portion 7 and a second half portion 8. The first half portion 7 functions as an arm rest 9. A pair of click switch buttons 10a and 10b are provided at the center of the arm rest 9. The second half portion 8 has a keyboard support portion 12 as shown in FIGS. 3 and 5. The keyboard support portion 12 is concave-shaped to have a rectangle corresponding to the size covering substantially the entire surface of the second half portion 8.

As shown in FIGS. 1 and 3, the keyboard support portion 12 has a flat keyboard support wall 13, and a pair of side walls 14a and 14b, which are continuous to the keyboard support wall 13. The keyboard support wall 13 is formed to face to the bottom wall 5a of the lower housing 5 and to be parallel with the bottom wall 5a. The keyboard support wall 13 has a boss portion 15 (FIG. 11) projecting downwardly. The boss portion 15 is positioned at the left end portion of the keyboard support wall 13. The side walls 14a and 14b are positioned to be spaced from each other in a width direction of the housing 4 and to be adjacent to the side walls 5b of the lower housing 5.

The keyboard support portion 12 has a keyboard 16. The key board 16 has a large number of keys 17, a joystick 18, which is one kind of pointing devices. The keyboard 16 is overlaid on the upper surface of the keyboard support wall 13.

Figure 11:
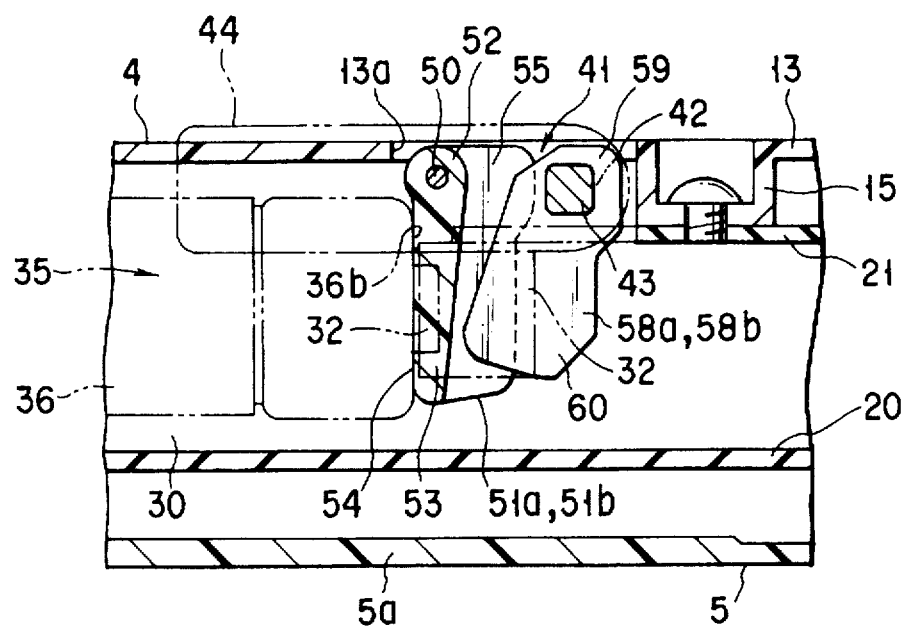
FIG. 11 is a sectional view of the computer showing a state that the operation member of the ejector is slid to the first position and that a pressing surface of a pressing member comes in contact with a connector setting surface of FDD.

As shown in FIG. 11, a first circuit board 20 and a second circuit board 21 are contained in the housing 4. The first circuit board 20 is fixed to the upper surface of the bottom wall 5a of the lower housing 5 with a screw. The first circuit board 20 is arranged to be parallel to the bottom wall 5a. The second circuit board 20 is fixed to the lower surface of the boss portion 15 of the keyboard support wall 13 with a screw. The second circuit board 21 is arranged to be parallel to the keyboard support wall 13. The second circuit board 21 is positioned at the upper portion of the back portion of the first circuit board 20. These first and second circuit boards 20 and 21 are arranged to be parallel to each other.

The display device 3 comprises a flat and boxed-shaped display housing 24, and a color liquid crystal display (LCD) 25 contained in the display housing 24. The display housing 24 has a front surface having a display window 26 formed. LCD 25 has a screen 25a on which information such as characters and graphics are displayed. The screen 25a is exposed to the outside of the display housing 24 through the display window 26.

The display device 3 is movably supported by a hinge device (not shown), which is formed at the rear end portion of the housing 4. Thereby, the display device 3 can be rotated between a closing position at which the arm rest 9 and the keyboard 16 are covered and an opening position at which the arm rest 9 and the keyboard 16 are exposed.

Figure 2:
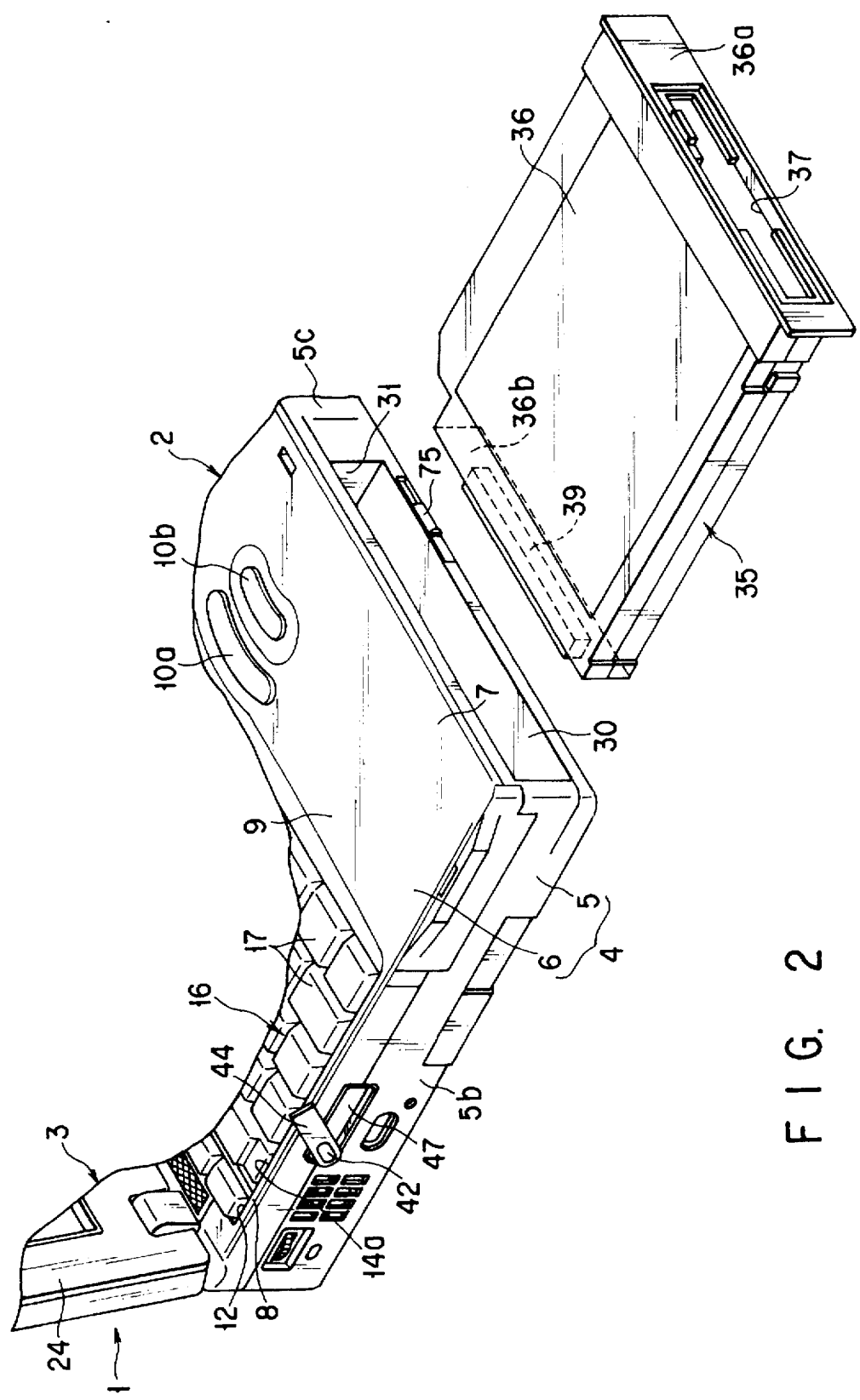
FIG. 2 is a perspective view of the computer showing a state that an FDD is taken out of a pack receptacle of a housing.

As shown in FIG. 2, the housing 4 comprises a pack receptacle 30. The pack receptacle 30 is positioned at the left side of the housing 4 to extend in a depth direction of the housing 4. The pack receptacle 30 is positioned at the upper side of the first circuit board 20. The rear portion of the pack receptacle 30 is positioned at the lower side of the keyboard support wall 13. Due to this, as shown in FIG. 3, the lower surface of the keyboard support wall 13 is exposed to the pack receptacle 30. The keyboard support wall 13 also serves as a top wall of the pack receptacle 30.

Figure 4:
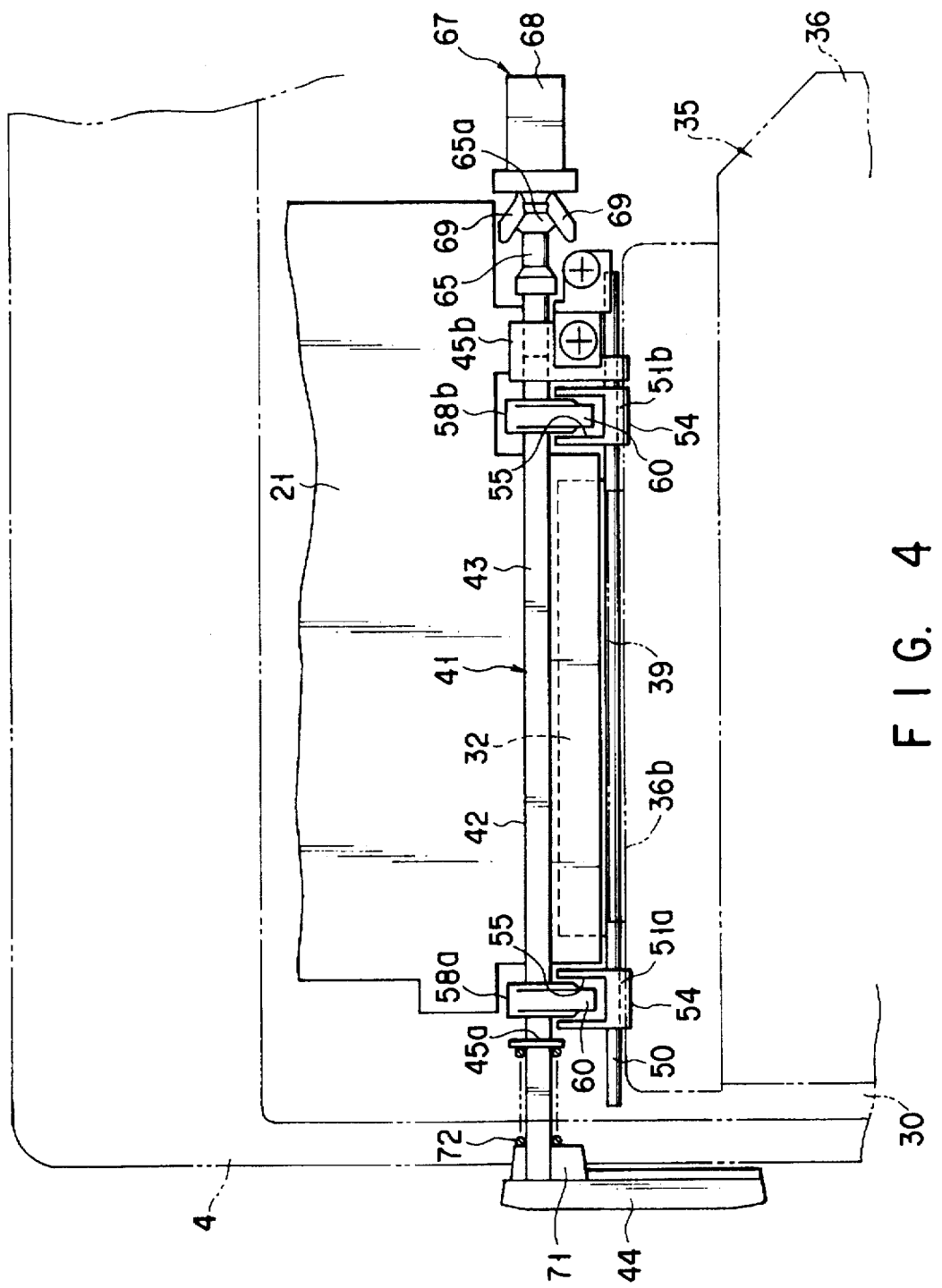
FIG. 4 is a plane view of the ejector.

The pack receptacle 30 has an insertion port 31 and a first connector 32 facing to the insertion port 31. The insertion port 31 is formed on the front wall 5c of the lower housing 5. As shown in FIGS. 4 and 11, the first connector 32 is mounted on the lower surface of the second circuit board 21. The first connector 32 extends in a width direction of the housing 4 at the final end portion of the pack receptacle 30.

As shown in FIG. 2, the pack receptacle 30 contains a floppy disk drive device (FDD) 35, serving as a pack device, which is detachable through the insertion port 31. A CD-ROM drive drive device (not shown) is exchanged for FDD 35 to be inserted to the pack receptacle 30. FDD 35 and the CD-ROM drive drive device are packaged as one module having an individual function. FDD 35 and the CD-ROM drive drive device have the same size as each other.

FDD 35 comprises a casing 36. The casing 36 is flat and box-shaped to have a size enough to be just fitted to the pack receptacle 30. The casing 36 has a front surface 36a having a disk insertion port 37 formed, and a connector setting surface 36b positioned at an opposite side of the front surface 36a. A second connector 39 is provided on the connector setting surface 36b. The second connector 39 is detachably connected to the first connector 32 when FDD 35 is inserted to the pack receptacle 30 from the insertion port 31. As a result, the computer 1 and FDD 35 are electrically connected to each other. In the state that the first and second connectors 32 and 39 are connected to each other, FDD 35 is completely contained in the pack receptacle 30. Then, the front surface 36a having the disk insertion port 37 is positioned at the opening end of the insertion port 31.

As shown in FIGS. 3 and 4, the housing 4 of the computer 1 comprises an ejector 41 for ejecting the FDD 35 or the CD-ROM drive drive device, which is contained in the pack receptacle 30. The ejector 41 is supported by the keyboard support wall 13 to be positioned at the final end portion of the pack receptacle 30.

The ejector 41 comprises operating means, which is manually operated by an operator, pressing means for pressing the FDD 35 or the CD-ROM drive drive device to a direction away from the first connector 32, and linking means for linking the operating means with the pressing means.

The operating means of the ejector 41 has an operation member 42. The operation member 42 comprises a shaft section 43 having first and second end portions and a lever section 44, which is continuous to the first end portion of the shaft section 43. The shaft section 43 and the lever section 44, which are made of metallic material, are formed as one member.

The shaft section 43 is formed to have a cross-section of a square pillar. The shaft section 43 is positioned to be horizontal along the width direction of the housing 4. The shaft section 43 is supported by the lower surface of the keyboard support wall 13 through a pair of metallic brackets 45a and 45b. The brackets 45a and 45b are fixed to the keyboard support wall 13 at the position where they are axially spaced from each other. The shaft section 43 is supported by the brackets 45a and 45b to be rotatable and slidable in the axial direction. The shaft section 43 is positioned at the upper side of the first connector 32.

Figure 6:
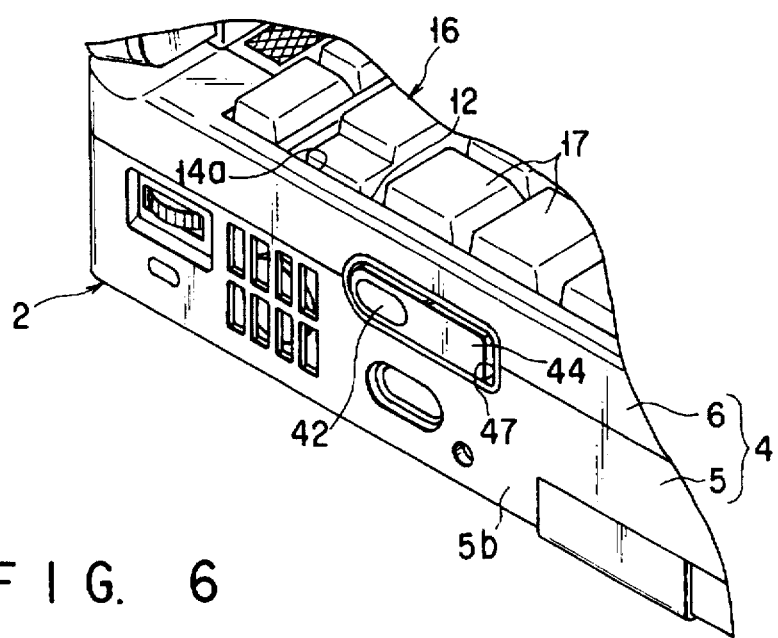
FIG. 6 is a perspective view of the computer showing a state that an operation member of the ejector is slid to a first position to be stored in a concave portion.
Figure 7:
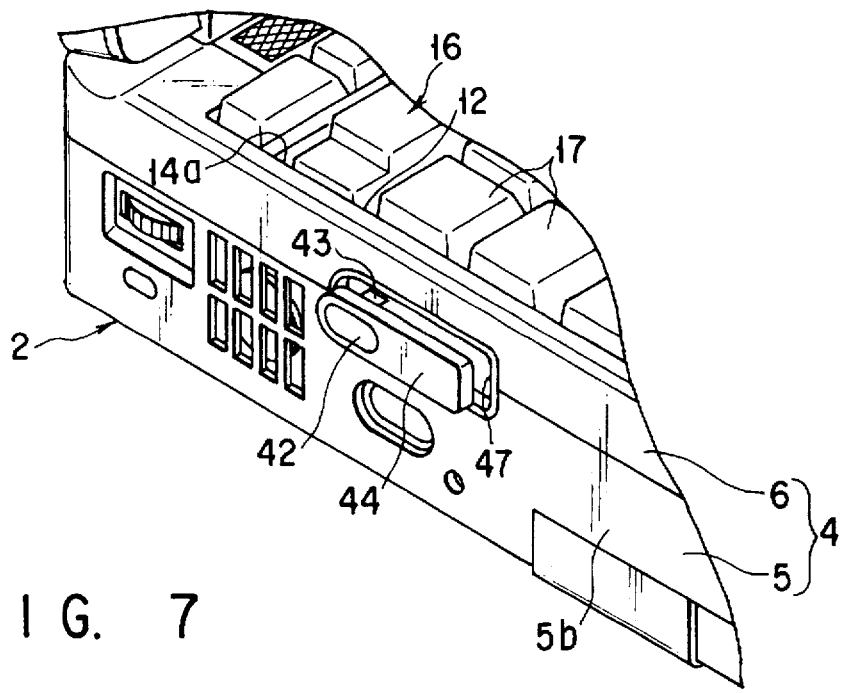
FIG. 7 is a perspective view of the computer showing a state that the operation member of the ejector is slid to a second position to be projected to a side portion of the housing.
Figure 8:
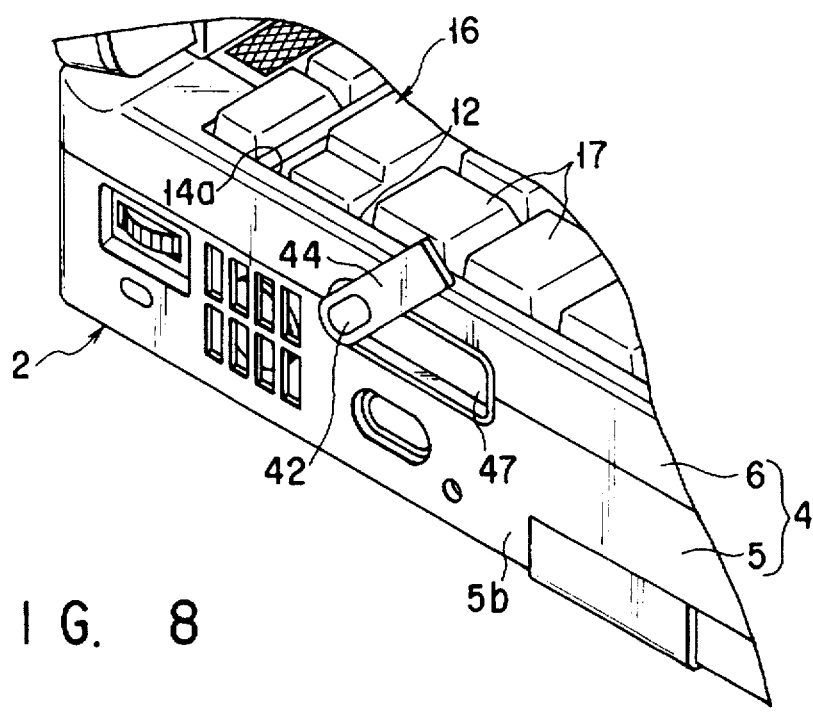
FIG. 8 is a perspective view of the computer showing a state that the operation member slid to the second position is rotated to a third position.

The lever section 44 is flat and plate-shaped to extend in the depth direction of the housing 4. The lever section 44 is placed along the side wall 5b of the left side of the housing 4. As shown in FIGS. 3 and 5, the side wall 5b has a concave portion 47 to which the lever section 44 is inserted. The concave portion 47 is continuous to the pack receptacle 30. The first end portion of the shaft section 43 is led to the concave portion 30. As a result, the operation member 42 is supported by the housing 4 to be slidable between a first position and a second position. The first position is a portion where the lever section 44 is stored in the concave portion 47 as shown in FIG. 6. The second position is a portion where the lever section 44 is projected to the outside of the housing 4 from the concave portion 47 as shown in FIG. 7.

In the state that the operation member 42 is slid to the second position, the lever section 44 is detached from the concave portion 47, and the insertion of the lever section 47 to the concave portion 47 is released. As a result, the operation member 42 can be rotated in the axial direction of the shaft section 43.

The pressing means of the ejector 41 comprises a support shaft 50, and a pair of synthetic resin-made pressing members 51a and 51b, which are supported by the support shaft 50. The support shaft 50 is supported by the keyboard support wall 13. The support shaft 50 is provided to be parallel to the shaft section 43 at the position, which is shifted to the insertion port 31 rather than the shaft section 43 of the operation member 42. The support shaft 50 is positioned at the upper side of the front surface of the first connector 32.

As shown in FIGS. 9 and 10, the pressing members 51a and 51b are arranged to be spaced from each other in the axial direction of the support shaft 50. The first connector 32 is positioned at the portion between the pressing members 51a and 51b. Each of the pressing members 51a and 51b has a boss portion 52 through which the support shaft 50 can be axially slid, and a pressing portion 53 extending downwardly from the boss portion 52. The upper end portion of the boss portion 52 is engaged with an opening portion 13a formed in the keyboard support wall 13. As a result, the movement of the pressing members 51a and 51b to the axial direction of the support shaft 50 is limited.

The pressing portion 53 has a flat pressing surface 54 facing to the insertion port 31, and an engaging concave portion 55, which is positioned to be opposite to the pressing surface 54. The pressing surface 54 is positioned at the final end portion of the pack receptacle 30. The pressing surface 54 comes in contact with the connector setting surface 36b of the casing 36 when FDD 35 is inserted to the pack receptacle 30 as shown in FIG. 11. As a result, the first connector 32 is positioned at the contacting portion between the pressing members 51a and 51b and the connector setting surface 36b. The engaging concave portion 55 is opened to be continuous to the back, upper and lower portions of the pressing portion 53. The upper end portion of the engaging concave portion 55 faces to the shaft section 43 of the operation member 42.

The linking means of the ejector 41 comprises a pair of synthetic resin-made linking members 58a and 58b, which are supported by the shaft section 43 of the operation member 42. The linking members 58a and 58b are arranged to be spaced from each other in the axial direction of the shaft section 43. Each of the linking members 58a and 58b has a boss portion 59 through which the shaft section 43 can be axially slid, and an engaging portion 60 extending downwardly from the boss portion 59. The upper end portion of the boss portion 59 is engaged with the opening portion 13a of the keyboard support wall 13. As a result, the movement of the linking members 58a and 58b to the axial direction of the shaft section 43 is limited. The engaging portion 60 is plate-shaped. The front end portion of the engaging portion 60 is engaged with the engaging concave portion 55 of the pressing portion 53. Due to this, in the state that the operating member 42 is slid to the second position, if the lever section 44 of the operating member 42 is rotated in the axial direction of the shaft section 43, the linking members 58a and 58b rotate together with the shaft section 43. As a result, the rotations of the linking members 58a and 58b can be transmitted to the pressing members 51a and 51b through the engaging section between the engaging portion 60 and the engaging concave portion 55. In other words, the operation member 42 is supported by the housing 4 to be rotatable between a third position and a fourth position at the second position. The third position is a portion where the pressing surface 54 of each of the pressing member 51a and 51b is advanced to the direction of the insertion port 31 than the front surface of the first connector 32. The fourth position is a portion where the pressing surface 54 is retracted backward than the front surface of the first connector 32. In the state that the operation member 42 is slid to the first position, the pressing surface 54 of each of the pressing member 51a and 51b is maintained at the position, which is continuous to the front surface of the first connector 32.

As shown in FIGS. 3 and 9, the keyboard support wall 13 has a recess portion 64. The recess portion 64 is formed at the position corresponding to the second end portion of the shaft section 43. An engaging piece 65 is coaxially connected to the second end portion of the shaft section 43. The engaging piece 65 has a head portion 65a having a large diameter at its top end.

A latch device 67 is provided in the recess portion 64 of the keyboard support wall 13. The latch device 67 has a box-shape case 68 and a pair of engaging claws 69 contained in the case 68. The case 68 is supported by the recess portion 64. The engaging claws 69 are supported by the case 68 to be movable between a position projecting from the case 68 and a position retreating to the case 68. The engaging claws 69 are pressed to the projecting position by a spring (not shown). The engaging claws 69 face to the engaging piece 65 of the operation member 42. The engaging claws 69 are pressed into the case 68 by the engaging piece 65 when the operation member 42 is slid to the first position. As a result, the engaging claws 69 are displaced to a direction where they are approaching each other. Then, the engaging claws 69 are hooked on the head portion 65a of the engaging piece 65 and the inner surface of the case 68. As a result, the engaging claws 69 are locked at the position where they are pressed to the case 68, and the operation member 42 is maintained at the first position. Even if the engaging claws 69 are engaged with the head portion 65a, they allow the engaging piece 65 to rotate to the axial direction of the shaft section 43.

In the state that the operation member 42 is maintained at the first position, if the lever section 44 is pressed by the tip of the operator's finger, the engaging claws 69 are further pressed into the case 68 through the engaging piece 65. As a result, the engagement of the engaging claws 69 with the case 68 is released. Then, the engaging claws 69 are pushed out of the case 68 by the spring to be displaced to the direction where they are spaced each other. As a result, the engagement of the engaging claws 69 with the engaging piece 65 is released, so that the shaft section 43 is pressed to the direction away from the case 68 through the engaging claws 69. Then, the operation member 42 is slid to the second position from the first position. In other words, the latch device 67 has a first function for maintaining the operation member 42 at the first position, and a second function for pushing the operation member 42 to the second position from the first position.

As shown in FIGS. 3 and 4, the first end portion of the shaft section 43 has a spring shoe 71. The spring shoe 71 faces to the bracket 45a. A compression coil spring 72 is provided on an outer periphery of the first end portion of the shaft section 43. The compression spring 72 is compressed between the spring shoe 71 and the bracket 45a. Due to this, the shaft section 43 receives force by which the shaft section 43 is pressed to the second position through the compression coil spring 72. Thereby, when the operation member 42 is slid to the second position from the first position, spring force of the compression coil spring 72 is added to pressing force of the engaging claws 69.

As shown in FIG. 2, a lock lever 75 is provided at the front wall 5c of the lower housing 5. The lock lever 75 locks FDD 35 or the CD-ROM drive drive device to the pack receptacle 30. The lock lever 75 is positioned at the lower portion of the insertion port 31. The lock lever 75 is supported by the lower housing 5 to be slidable between a locking position and a lock releasing position. The locking position is a portion where the lock lever 75 is hooked on the casing 36 of FDD 35 or that of the CD-ROM drive drive device. The lock releasing position is a portion where the lock lever 75 is detached from the casing 36.

According to the above-structured portable computer 1, in the state that FDD 35 is contained in the pack receptacle 30 of the housing 4, the second connector 39 of FDD 35 is connected to the first connector 32 of the pack receptacle 30. Thereby, the computer 1 and FDD 35 are electrically connected to each other. In this state, the operation member 42 of the ejector 41 is slid to the first position. Due to this, the pressing surface 54 of each of the pressing members 51a and 51b linking with the operation member 42 is rotated to a position where the pressing surface 54 simply comes in contact with the connector setting surface 36 of FDD 35. In addition, the engaging piece 65 of the operation member 42 is engaged with the engaging claws 69 of the latch device 67. Thereby, the operation member 42 is maintained at the first position. Also, the lock lever 75 of the lower housing 5 is slid to the locking position, so that FDD 35 is locked to the pack receptacle 30.

For taking FDD 35 out of the pack receptacle 30, first, the lock lever 75 is slid to the lock releasing position from the locking position, so that the lock of FDD 35 due to the lock lever 75 is released. Next, the lever section 44 of the operation member 42 exposed to the side wall 5b of the housing is pressed by the tip of the operator's finger to press the operation member 42 into the interior of the housing 4. Thereby, the engagement of the engaging claws 69 with the case 68 is released. As a result, the engaging claws 69 are pushed out of the case 68, the engagement of the engaging claws 69 with the head portion 65a of the engaging piece 65 is released. Then, the operation member 42 is slid to the second position from the first position by the engaging claws 69. The shaft section 43 of the operation member 42 is urged to the second position by the compression coil spring 72. Due to this, if the maintenance of the operation member 42 due to the latch device 67 is released, spring force of the compression coil spring 72 works in addition to urging force of the engaging claws 69. Therefore, the operation member 42 is speedily slid to the second position from the first position, and the lever section 44 of the operation member 42 projects to the housing 4 as shown in FIG. 7.

Figure 12:
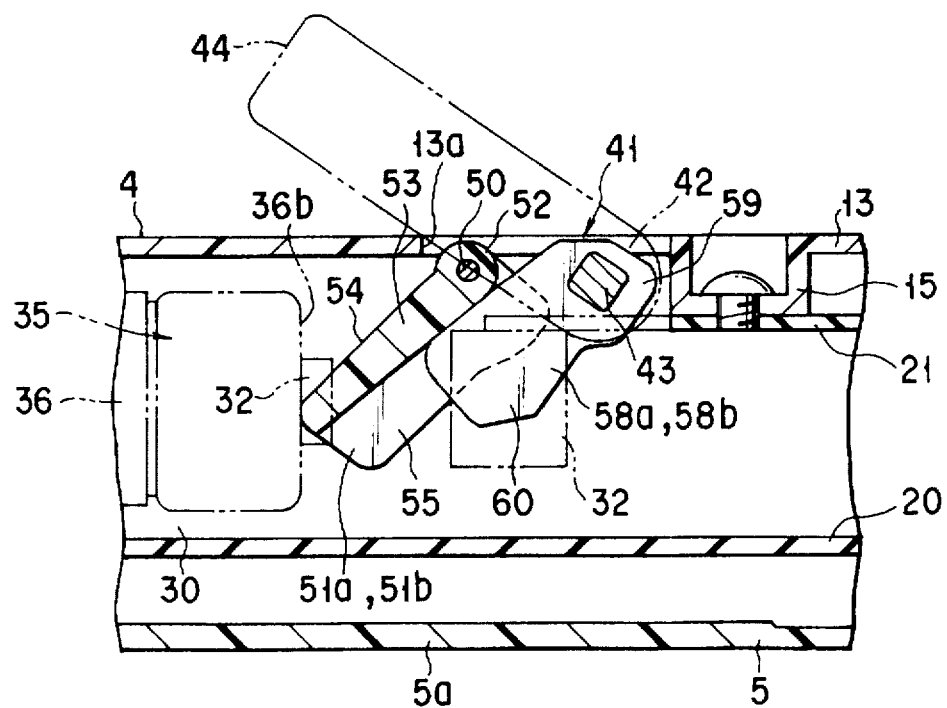
FIG. 12 is a sectional view of the computer showing a state that the operation member of the ejector is rotated to the third position and that FDD is pressed out of the pack receptacle by the pressing member.

If the operation member 42 is slid to the second position, the lever section 44 is rotated upwardly to be directed to the third position. As a result, the link members 58a and 58b are rotated at a predetermined angle with the shaft section 43. Then, the engaging portion 60 of the link members 58a and 58b come in contact with the engaging concave portion 55 of the pressing members 51a and 51b. Thereby, the rotation of the shaft section 43 is transmitted to the pressing members 51a and 51b through the link members 58a and 58b. As a result, as shown in FIG. 12, the pressing portion 53 of the pressing members 51a and 51b is rotated to advance to FDD 35, and the connector setting surface 36 of FDD 35 is pressed in the direction away from the first connector 32. Then, the connection of the first connector 32 to the second connector 39 is released, and FDD 35 is pushed to the out side of the housing 4 through the insertion port 31.

Finally, FDD 35 pushed out of the insertion port 31 is grasped by the operator's hand to draw FDD 35 from the insertion port 31. Thereby, FDD 35 is finished to be taken out of the pack receptacle 30.

According to the above-structured portable computer 1, the pressing members 51a and 51b of the ejector 41 are linked with the operation member 42 to be rotated so that the connector setting surface 36 of FDD 35 is pressed. As compared with the conventional slide system, force for pressing FDD 35 is increased. Due to this, even if the connection force of the first connector 32 and the second connector 39 is strong, the force for pressing FDD 35 can easily overcome the connection force. Therefore, FDD 35 can surely pushed to the insertion port 31, and the eject operation of FDD 35 can be smoothly carried out.

Moreover, since the lever section 44 is projected to the outside of the housing 4 when the operation member 42 is rotated from the third position to the fourth position, the surroundings of the lever section 44 are widely opened. As a result, the lever section 44 can be easily grasped by the operator's fingers, operability for rotating the operation member 42 is improved.

For taking FDD 35 out of the pack receptacle 30, the operation member 42 is slid to the second position from the first position. Moreover, at the second position, the operation member 42 is rotated to the third position. Since the conscious operation including the above-mentioned two steps is needed, FDD 35 can be prevented from being carelessly taken out of the pack receptacle 30. Also, breakage of information stored in FDD 35 and the erroneous operation of the computer 1 can be prevented.

After FDD 35 is finished to be taken out of the pack receptacle 30, if the operation member 42 is slid to the first position, the engaging piece 65 of the operation member 42 is engaged with the engaging claws 69 of the latch device 67, so that the operation member 42 is maintained at the first position. As a result, the lever section 44 is inserted to the concave portion 47 of the side wall 5b, and a sense of unity of the lever section 44 and the housing 4 can be obtained. In other words, the presence of the lever section 44 is not conspicuous, and the appearance of the computer 1 is improved.

Since the lever section 44 is not projected to the outside of the housing 4, there is no possibility that the operator will carelessly touch the lever section 44 by his finger. This effectively contributes to the prevention of erroneous operation of the lever section 44.

In addition, according to the above-structured ejector 41, the operation member 42 and the pressing members 51a and 51b, which are rotated by the operation member 42, are arranged on the upper side of the pack receptacle 30. It is unnecessary to form a notch on the first circuit board 21 to avoid the ejector 41. Moreover, it is unnecessary to position the first circuit board 21 to avoid the ejector 41. Therefore, since the size of the first circuit board 21 is not limited, it is unnecessary to consider the position of the first circuit board 21.

In the above-explained embodiment, the pressing member for pressing FDD was provided on the support shaft, which was different from the shaft section of the operation member. Then, the shaft section and the pressing member were linked with each other through the link members. However, the present invention is not limited to the above-mentioned structure. For example, the pressing member may be directly attached onto the shaft section of the operation member.

Also, the portable apparatus of the present invention is not limited to the portable computer. For example, the present invention can be applied to the other portable apparatus such as a word processor.

Additional advantages and modifications will readily occur to those skilled in the art. Therefore, the invention in its broader aspects is not limited to the specific details and representative embodiments, shown and described herein. Accordingly, various modifications may be made without departing from the spirit or scope of the general inventive concept as defined by the appended claims and their equivalents.

We claim:

1. A portable apparatus comprising:

a housing, having a bottom wall and a peripheral wall continuous to the bottom wall, and an insertion port formed on the peripheral wall;

a pack receptacle defined to an interior of said housing, said pack receptacle continuous to said insertion port, and having a first connector facing to said insertion port;

a pack device detachably contained in said pack receptacle through said insertion port, said pack device having a second connector detachably connected to said first connector when said pack device being contained in said pack receptacle;

a circuit board contained in the interior of said housing, said circuit board placed between said pack receptacle and the bottom wall of said housing; and an ejector, provided in the pack receptacle, for ejecting said pack device from said pack receptacle, wherein said ejector includes pressing means for pressing said pack device in a direction away from said first connector, and operating means for linking with said pressing means, said operating means is positioned at the upper portion of said circuit board, and has a lever section along the peripheral wall of said housing, said operating means is supported by said housing to be slidable between a first position where said lever section is stored in the peripheral wall of said housing and a second position where said lever section is projected to the outside of said peripheral wall, and said operating means is supported by said housing to be rotatable between an ejecting position where said pressing means is advanced to said pack device contained in said pack receptacle at said second position, and a releasing position where said pressing means is positioned to be away from said pack device.

2. The apparatus according to claim 1, wherein said ejector has a latch device linking with said operating means, and said latch device comprises a first function for maintaining said operating means at the first position and a second function for pressing said linking means from the first position to the second position when said operating means is slid to the first position.

3. The apparatus according to claim 2, wherein said ejector comprises a spring for pressing said operating means to the second position.

4. The apparatus according to claim 1, wherein the peripheral wall of said housing has a concave portion where the lever section of said operating means is inserted when said operating means is slid to the first position.

5. The apparatus according to claim 1, wherein said ejector comprises linking means for transmitting movement of said operating means to said pressing means when said operating means is rotated to said ejecting position and said releasing position.

6. The apparatus according to claim 5, wherein said pressing means has a plurality of pressing members facing to the pack device contained said pack receptacle and a support shaft for supporting these pressing members, said operating means has an operation shaft positioned to be continuous to said lever section and parallel to said support shaft, and said linking means has a plurality of linking members supported by said operation shaft, and these linking members come in contact with said pressing member.

7. The apparatus according to claim 6, wherein said pressing members are arranged to face to said insertion port in the vicinity of said first connector.

8. The apparatus according to claim 7, wherein said first connector is positioned between said pressing members in seeing said pack receptacle from the direction of said insertion port.

9. The apparatus according to claim 6, wherein said pressing members are rotatably supported by said support shaft, and said linking members are supported by said operation shaft to be rotatable in an axial direction of said operation shaft and to be slidable in the axial direction of said operation shaft.

10. The apparatus according to claim 9, wherein each of said pressing members has a pressing surface for pressing said pack device, and a concave portion, positioned to be opposite to the pressing surface, where said linking members are engaged.

11. A portable apparatus comprising:

a housing, having a bottom wall and a top wall facing to the bottom wall;

a pack receptacle defined to an interior of said housing, said pack receptacle having an insertion port and a first connector facing to said insertion port;

a pack device detachably contained in said pack receptacle through said insertion port, said pack device having a second connector detachably connected to said first connector when said pack device being contained in said pack receptacle;

a circuit board contained in the interior of said housing, said circuit board supported by said bottom wall at the lower portion of said pack receptacle; and an ejector, provided in the pack receptacle, for ejecting said pack device from said pack receptacle, wherein said ejector includes pressing means, positioned in the vicinity of said first connector and supported by the top wall of said housing, for pressing said pack device, contained in said pack receptacle, in a direction away from said first connector, and operating means for linking with said pressing means, said operating means has a lever section exposed to the outside of said housing, and said operating means is supported by said housing to be slidable between a first position where said lever section is stored in said housing and a second position where said lever section is projected to the outside of said housing, and said operating means is supported by said housing to be rotatable between an ejecting position where said pressing means is advanced to said pack device contained in said pack receptacle at said second position, and a releasing position where said pressing means is positioned to be away from said pack device.

12. The apparatus according to claim 11, wherein said housing has a peripheral wall continuous to said bottom wall and said top wall, said lever section of said operating means is positioned along said peripheral wall, and said peripheral wall has a concave portion where said lever section is inserted when said operating means is slid to the first position.

13. A portable apparatus comprising:

a housing;

a receptacle defined to an interior of said housing, said receptacle having an insertion port and a first connector facing to said insertion port;

a function part detachably contained in said receptacle through said insertion port, said function part having a second connector detachably connected to said first connector when said function part being contained in said receptacle; and an ejector, provided in the receptacle, for ejecting said function part from said receptacle, wherein said ejector has an operation member manually operated, a pressing member for releasing the connection between said first and second connectors, and a linking member for linking said operation member with said pressing member, said operation member is supported by said housing to be slidable between a first position where said operation member is stored in said housing and a second position where said operation member projects to the outside of said housing, and said operation member is supported by said housing to be rotatable between a third position where said pressing member is advanced to said function part contained in said receptacle through said linking members to eject said function part from said receptacle and a fourth position where said pressing member is retracted to a direction away from said function part through said linking members in a state that said operation member is slid at said second position.

14. The apparatus according to claim 13, wherein said ejector has a latch device linking with said operation member, and said latch device comprises a first function for maintaining said operation member at the first position to be releasable, and a second function for pressing said operation member from the first position to the second position when said operation member is slid to the first position.

15. The apparatus according to claim 14, wherein said ejector comprises a spring for pressing said operation member to the second position.

16. The apparatus according to claim 13, wherein said housing comprises a peripheral wall having said insertion port formed and a bottom wall continuous to said peripheral wall, a circuit board is contained in said housing, and said circuit board is supported by the bottom wall of said housing at the lower portion of said receptacle.

17. The apparatus according to claim 16, wherein said pressing member and said linking member are linked with each other at the upper portion of said circuit board.

18. The apparatus according to claim 16, wherein said operation member has a lever section along the peripheral wall of said housing, and said peripheral wall has a concave portion where said lever section is inserted when said operation member is slid to the first position.

19. The apparatus according to claim 17, wherein said operation member has an operation shaft supported by said housing, and said linking member is supported by said operation shaft to be rotatable in an axial direction of said operation shaft and to be slidable in the axial direction of said operation shaft.

* * * * *